(12) United States Patent
Scro, II

(10) Patent No.: US 8,881,644 B1
(45) Date of Patent: Nov. 11, 2014

(54) SELF-BASTING ROASTING OVEN

(76) Inventor: Nicholas J. Scro, II, Thompsonville, IL (US)

( * ) Notice: Subject to any disclaimer, the term of this patent is extended or adjusted under 35 U.S.C. 154(b) by 888 days.

(21) Appl. No.: 12/974,790

(22) Filed: Dec. 21, 2010

Related U.S. Application Data

(60) Provisional application No. 61/288,546, filed on Dec. 21, 2009.

(51) Int. Cl.
*A47J 37/10* (2006.01)

(52) U.S. Cl.
USPC ............... 99/347; 99/345; 99/346; 99/516; 99/534

(58) Field of Classification Search
USPC ............... 99/346, 345, 347, 516, 535, 534
See application file for complete search history.

(56) References Cited

U.S. PATENT DOCUMENTS

| | | | |
|---|---|---|---|
| 323,622 A | 8/1885 | Baar | |
| 427,671 A | 5/1890 | Carpenter | |
| 1,349,302 A | 8/1920 | Spitz | |
| 1,712,242 A | 5/1929 | Zimmermann | |
| 3,055,287 A * | 9/1962 | Louise Henry Beulah | 99/346 |
| 3,295,434 A | 1/1967 | Wilhelm et al. | |
| 3,311,048 A * | 3/1967 | Pickering | 99/346 |
| 3,922,960 A * | 12/1975 | Lewis | 99/346 |
| 4,061,083 A | 12/1977 | Caliva | |
| 5,708,255 A * | 1/1998 | Lamanna et al. | 219/396 |
| 5,727,449 A | 3/1998 | Healy et al. | |
| 5,913,965 A | 6/1999 | Gargano | |
| 6,086,118 A * | 7/2000 | Mc Naughton et al. | 285/305 |
| 6,274,847 B1 * | 8/2001 | Hlava et al. | 219/433 |
| 6,362,459 B1 * | 3/2002 | Schmidt | 219/414 |
| 6,582,745 B1 | 6/2003 | Northern | |
| 6,588,324 B1 | 7/2003 | Mor et al. | |
| 6,796,219 B1 * | 9/2004 | Rubin | 99/346 |
| 6,892,628 B2 * | 5/2005 | Northern | 99/346 |
| 7,461,588 B2 * | 12/2008 | Head | 99/326 |
| 2002/0178932 A1 * | 12/2002 | Cai | 99/516 |
| 2006/0144871 A1 * | 7/2006 | Van Tuyl et al. | 222/420 |

* cited by examiner

*Primary Examiner* — Dana Ross
*Assistant Examiner* — James Sims, III
(74) *Attorney, Agent, or Firm* — Robert C. Montgomery; Montgomery Patent & Design

(57) ABSTRACT

A food cooking apparatus with an integral basting pump system comprises a common countertop roasting oven, typically used to prepare turkeys and other large foodstuffs further performing the additional duty of automatically basting the foodstuffs. The apparatus collects basting liquid and juices from the foodstuffs at the bottom of the roasting pan area, where an electrically-powered recirculating pump transfers the liquid to the top of the oven for spraying or dripping down upon the foodstuffs being cooked. In such a manner the foodstuffs are kept moist and tender while reducing cooking time since the oven is not opened to perform a manual basting process. The basting application is controlled using a plurality of dials on the oven that govern application time, and application intervals.

15 Claims, 7 Drawing Sheets

SELF-BASTING ROASTING OVEN

RELATED APPLICATIONS

The present invention was first described in and claims the benefit of U.S. Provisional Application No. 61/288,546 filed Dec. 21, 2009, the entire disclosures of which are incorporated herein by reference.

FIELD OF THE INVENTION

The present invention relates generally to cooking ovens, and in particular, to a standalone roaster oven with an automatic basting mechanism.

BACKGROUND OF THE INVENTION

Basting is a common cooking technique when preparing large pieces of meat such as a turkey, a chicken, roasts or the like. Such foods will become dry if they are not basted several times during the cooking process. Common basting liquids such as melted butter, liquid fat, meat drippings or liquid such as a stock are usually spooned over the food or applied with a conventional bulb-type siphon.

While such methods undoubtedly work, they do have some disadvantages. First, the chef may easily forget about the next basting interval causing an entire meal to be ruined. Secondly, the door of the oven must be opened to perform the basting process, thus causing uneven temperature regulation and increased cooking time. Finally, and perhaps most important, the basting process is not continuous in the sense that it is only performed during certain time intervals. This may allow the meat dry out between consecutive bastings which will permanently negatively affect its overall taste.

Various attempts have been made to provide food basting systems. Examples of these attempts can be seen by reference to several U.S. patents. U.S. Pat. No. 1,712,242, issued in the name of Zimmermann, describes a self-basting and turning roaster which enables a user to rotate a foodstuff within the roaster in order to evenly apply a basting fluid without having to remove the lid of the apparatus.

U.S. Pat. No. 4,061,083, issued in the name of Caliva, describes an automatic food roasting and basting device which provides a fire box with a rotating spit and a basting unit located above the spit. The Caliva device can be utilized with a belt or pulley and a separate motor to rotate the spit and basting unit in order to apply a basting liquid while rotating a spitted foodstuff.

U.S. Pat. No. 6,582,745, issued in the name of Northern, describes a self-basting cooking apparatus including an external pump and a container of a basting liquid which is automatically periodically pumped into the cooking apparatus.

U.S. Pat. No. 6,796,219, issued in the name of Rubin, describes an automatic basting apparatus for use with an oven including a pump apparatus disposed outside of the oven and a transparent reservoir for monitoring the fluid level without opening the oven.

While these devices fulfill their respective, particular objectives, each of these references suffer from one (1) or more of the aforementioned disadvantages. Many such devices require lengthy installation or setup. Also, many such devices require manual intervention on a periodic basis to enact the basting process. Furthermore, many such devices utilize an intermittent basting process which may allow the meat dry out between consecutive bastings. In addition, many such devices are not suited for indoor use. Moreover, many such devices must be installed in a permanent location and cannot be easily repositioned or transported. Accordingly, there exists a need for an automatic basting system without the disadvantages as described above. The development of the present invention substantially departs from the conventional solutions and in doing so fulfills this need.

SUMMARY OF THE INVENTION

In view of the foregoing references, the inventor recognized the aforementioned inherent problems and observed that there is a need for a self-contained continuous basting apparatus which is quickly and portably utilizable in a variety of common locations. Thus, the object of the present invention is to solve the aforementioned disadvantages and provide for this need.

To achieve the above objectives, it is an object of the present invention to provide self-contained electrically heated cooking for foodstuffs and simultaneously provide automatic and accurately controlled basting of the foodstuffs. The apparatus enables control of cooking temperature, cook time duration, start delay, and a basting time interval.

Another object of the present invention is to provide a rectangular enclosure similar to a conventional countertop roasting oven further including a power cord, a removable lid, and a plurality of handles.

Yet still another object of the present invention is to collect a basting liquid from the enclosure and automatically reapply the basting liquid to contained foodstuffs. A bottom interior surface of the enclosure is slightly sloped to direct collected liquids to a liquid sump. The apparatus further includes a removable cooking rack to support the foodstuffs slightly above the bottom surface of the enclosure.

Yet still another object of the present invention is to automatically cycle basting liquid collected into the liquid sump with a plurality of tubes and an inline miniature electric basting pump which is housed within a side wall portion of the enclosure. A pickup suction arm located within the liquid sump is in fluid communication with the tubes and pump and allows collected liquid to enter the tubes.

Yet still another object of the present invention is to inhibit entrained solids within the basting liquid from blocking the pump, tubes, or nozzles by comprising a removable strainer located across a top opening of the liquid sump and a replaceable cylindrical filter which covers an open end of the pickup suction arm.

Yet still another object of the present invention is to enable fluid communication between the enclosure and the removable lid via a junction point comprising a removably attachable connection between a tubing joint disposed along a top rim portion of the enclosure and an upper riser tube fastened to a bottom surface of the lid.

Yet still another object of the present invention is to disperse basting liquid downwardly onto foodstuffs within the enclosure during use. Basting liquid within the upper riser tube travels into a dispersing header also fastened to a bottom surface of the lid. The dispersing header comprises a plurality of downward facing spray nozzles which spray the liquid under pressure from the pump to coat the contained foodstuffs. Excess liquid can then fall off onto the bottom surface of the enclosure in order to re-enter the liquid sump and continue the cycle.

Yet still another object of the present invention is to automatically turn off the pump and disable the dispensing function upon removal of the lid from the enclosure. A lip portion of the enclosure which supports the lid further includes an integral safety switch which disables the pump when it is not depressed. During a normal cooking cycle, the switch is depressed by the weight of the lid and the basting function is enabled.

Yet still another object of the present invention is to enable quick disassembly of the removable lid and dispersing header with use of removable fasteners, thereby facilitating quick and thorough cleaning of the apparatus after use.

Yet still another object of the present invention is to provide control of a plurality of basting process functions with an operating control panel disposed along an exterior portion of the enclosure. The control panel includes a plurality of dial knobs which allow a user to selectively control the ON/OFF state of the apparatus, a temperature setting, a delay start time, a basting interval, and the like.

Yet still another object of the present invention is to provide a method of utilizing the apparatus that provides a unique means of obtaining the apparatus, placing a foodstuff within the enclosure, adding a suitable volume of basting liquid within the enclosure, connecting the power cord to a suitable source of electric power, placing the lid on the lip of the enclosure, utilizing the operating control panel to activate and configure the apparatus, and benefitting from accurate and automatic basting of the contained foodstuffs.

Further objects and advantages of the present invention will become apparent from a consideration of the drawings and ensuing description.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
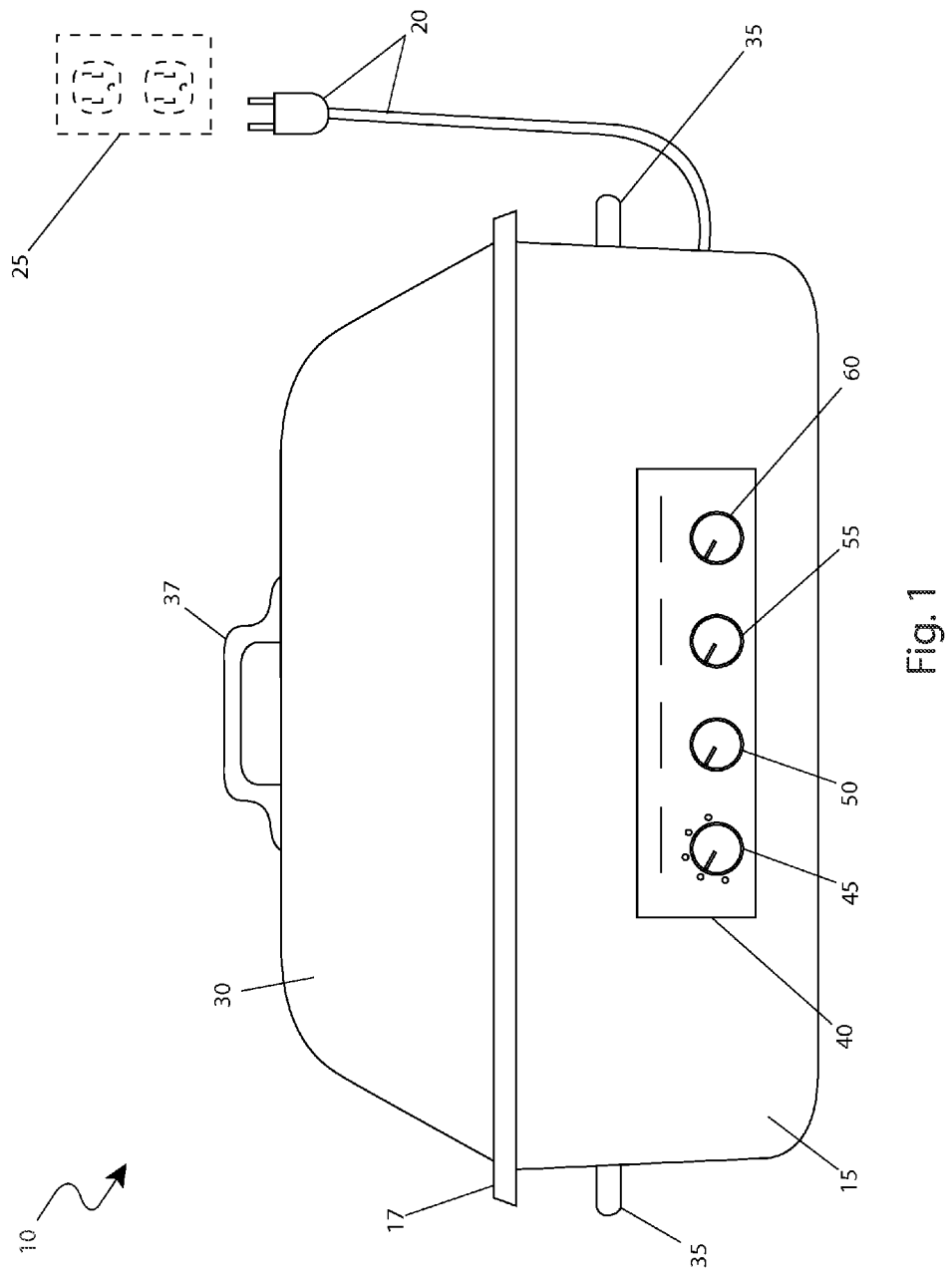
FIG. 1 is a front view of a self-basting roasting oven 10, according to the preferred embodiment of the present invention.

DESCRIPTIVE KEY 10 roasting oven with integral automatic basting
15 enclosure
17 lip
20 power cord
25 120 VAC power outlet
27 safety switch
30 removable lid
35 first handle
37 second handle
40 operating control panel
45 temperature setting dial
50 operating time dial
55 delay time start dial
60 basting interval dial
65 basting pump
70 liquid sump
75 cooking cavity
77 cooking rack
80 bottom surface
85 pickup suction arm
86 strainer
88 filter
90 lower riser tube
92 pump inlet tube
95 tubing joint
100 upper riser tube
102 tubing clip
103 sealing feature
105 dispersing header
110 spray nozzle
115 basting liquid
120 foodstuffs
125 electrical contactor
130 electrical heating element
135 internal thermostat
140 threaded fastener
145 wiring

DETAILED DESCRIPTION OF THE PREFERRED EMBODIMENT

The best mode for carrying out the invention is presented in terms of its preferred embodiment, herein depicted within FIGS. 1 through 7. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a self-basting roasting oven (herein described as the "apparatus") 10, which provides a conventional electrically heated and self-contained cooking means for foodstuffs 120, particularly suited for poultry and other meat items, while providing an additional automatic and accurately controlled basting means. The apparatus 10 comprises a liquid sump 70 which collects basting liquids 115 from a bottom portion of the roasting apparatus 10, and then pumps said basting liquid 115 to a superjacent dispersing header 105 to be sprayed down upon the foodstuffs 120 automatically during the cooking process. The apparatus 10 provides control of cooking temperature, cook time duration, start delay, and a basting interval time via a front mounted operating control panel 40.

Figure 2:
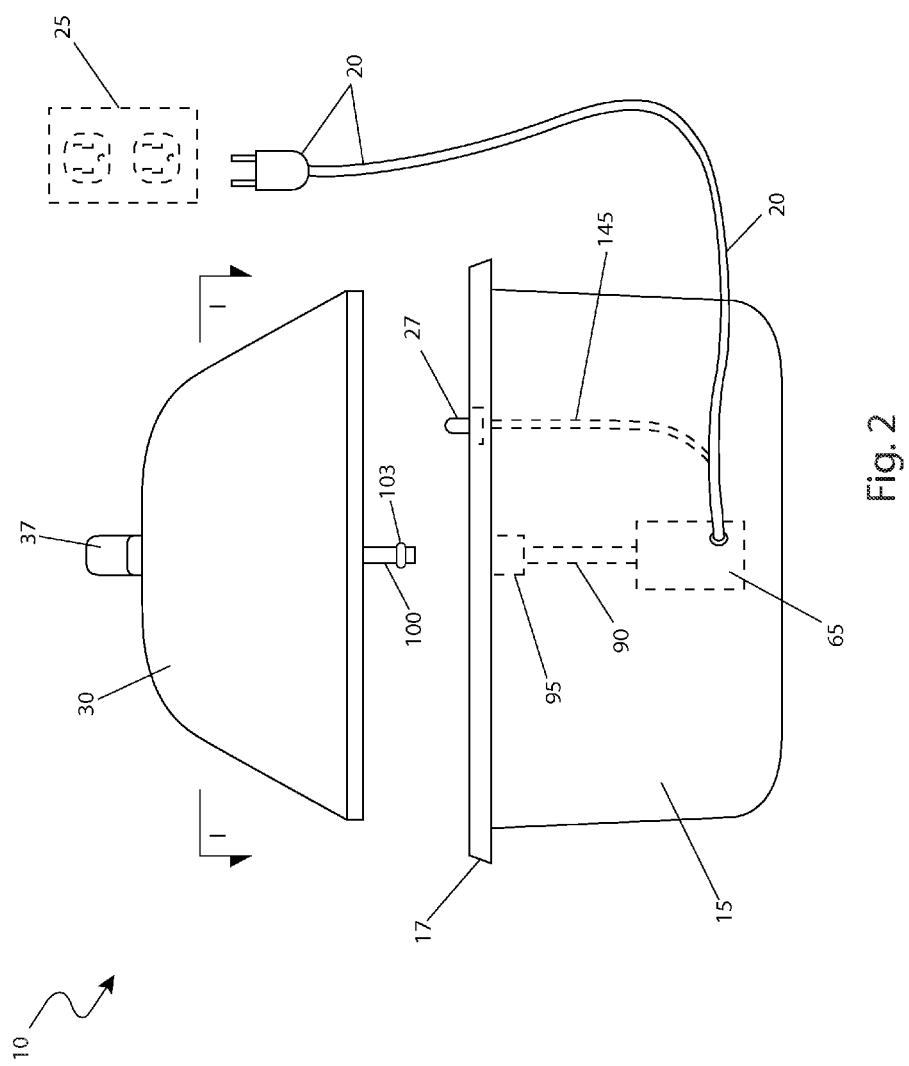
FIG. 2 is a side view of the self-basting roasting oven 10 depicting disengagement of a removable lid portion 30, according to the preferred embodiment of the present invention.

Referring now to FIGS. 1 and 2, front and side views of the apparatus 10, according to the preferred embodiment of the present invention, are disclosed. The apparatus 10 comprises an elongated rectangular enclosure 15 having a large removable lid 30 being similar to conventional countertop roasting ovens. The apparatus 10 comprises a power cord 20 which is to be connected to a standard household 120 VAC power outlet 25. The enclosure 15 comprises a pair of "U"-shaped first handles 35 permanently mounted to opposing short side portions of said enclosure 15 as would be expected. Additionally, the removable lid 30 further comprises a large "U"-shaped second handle 37 at a top center position allowing for easy access and removal of the foodstuffs 120 from within. An operating control panel 40 is located along a front surface of the enclosure 15 which comprises a plurality of rotary dials which govern operation and control of the apparatus 10 (see FIG. 4). It is envisioned that the apparatus 10 be introduced in various sizes such as small, medium, and large, and in various attractive colors and patterns based upon a user's preference. Furthermore, the removable lid 30 is envisioned to be made using transparent, translucent, or opaque materials such as plastic, porcelainized metal, glass, or the like.

The enclosure 15 comprises an outwardly protruding lip portion 17 along an upper edge of the enclosure 15. Said lip 17 further comprises a shelf-like feature along an inner upper edge which provides nested insertion of the removable lid 30 (see FIG. 3). Said lip 17 also comprises an integral safety switch 27, thereby providing a safe means to halt the basting process in an event the removable lid 30 is lifted from the enclosure 15. Said safety switch 27 is preferably a conventional plunger-type pressure switch being in electrical communication with the operating control panel 40 via internal wiring 145 (see FIG. 6). However, other types of switching devices may be utilized with equal benefit and as such should not be interpreted as a limiting factor of the apparatus 10. During a normal cooking cycle, said safety switch 27 is depressed by the weight of the removable lid 30, thereby enabling the basting function.

Figure 3:
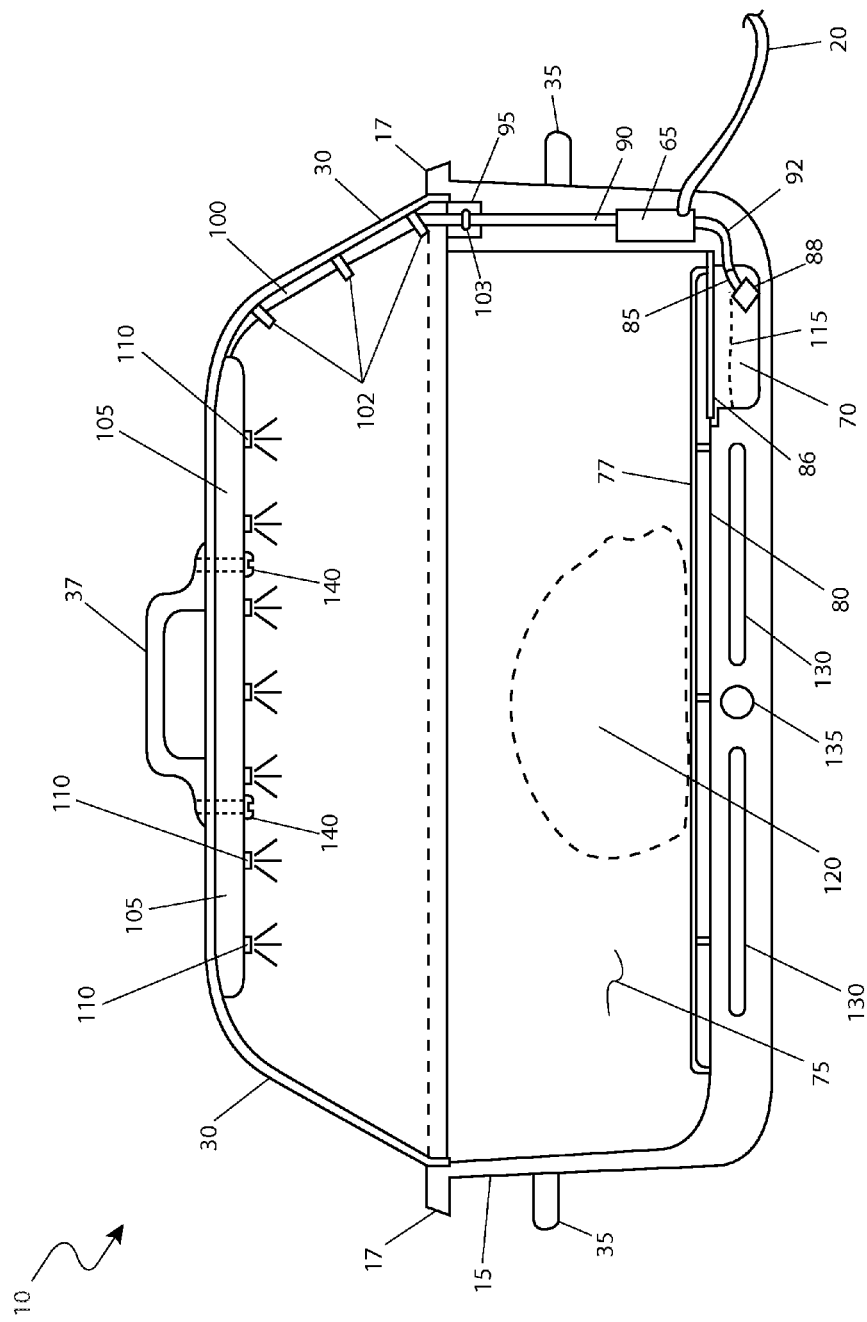
FIG. 3 is a sectional view of the self-basting roasting oven 10, as seen along a line I-I (see FIG. 2), according to the preferred embodiment of the present invention.

Referring next to FIG. 3, a sectional view of the apparatus 10 as seen along a line I-I, according to the preferred embodiment of the present invention, is disclosed. The internal operating components which distinguish the apparatus 10 from a conventional roasting oven are depicted here. A liquid sump 70 extends across an end portion of a slightly sloped bottom surface 80 within a cooking cavity portion 75 of the enclosure 15. The liquid sump 70 provides a means to collect and recycle the basting liquid 115 and comprises a shallow recessed area approximately one (1) inch in depth and three (3) inches in width. The foodstuffs 120 are supported slightly above said bottom surface 80 of the enclosure by a removable cooking rack 77 which comprises an open welded wire construction to allow the basting liquid 115 and any juices from the foodstuffs 120 to drain freely into the sump 70 (see FIG. 6). Said liquid sump 70 further comprises a removable strainer 86 which covers a top opening of said liquid sump 70, being generally coplanar with the bottom surface 80 of the enclosure 15. The strainer 86 comprises a plastic or stainless steel screen-mesh material which provides a means to separate out solid particles as the basting liquid 115 enters the liquid sump 70. The liquid sump 70 further comprises a pickup suction arm 85 having a small press-on and replaceable cylindrical filter 88 being affixed to a proximal end portion of said pickup suction arm 85. The filter 88 provides secondary removal of solids from said basting liquid 115 upon entering the liquid sump 70 and subsequently entering the pickup suction arm 85. The strainer 86 and filter 88 act to prevent entrained solids from blocking the pump 65, tubes 92, 90, 100, dispersing header 105, and nozzles 110. A distal end portion of the pickup suction arm 85 is connected to a pump inlet tube 92 via a removably attached slip-fit tubing connection providing convenient disassembly. Said pump inlet tube 92 is in fluid communication with a suction side of an in-line miniature electric basting pump 65 which is envisioned to be integrated aesthetically into a side wall portion of the enclosure 15. The basting pump 65 comprises a low pressure and low volume positive displacement or vibratory unit being capable of withstanding high heat exposure. The basting liquid 115 pumped from the basting pump 65 is routed upwardly through a lower riser tube 90 to the rim portion 17 of the enclosure 15 where it connects to a tubing joint 95 which provides a removably attachable fluid transfer means at the junction point between the enclosure 15 and the removable lid 30 (see FIG. 5). In such a manner, the lower riser tube 90 remains physically attached to the enclosure 15, while an upper riser tube 100 is removed when the removable lid 30 is removed.

The upper riser tube 100 is in turn removably inserted into an end portion of a dispersing header 105 which further comprises a plurality of downward facing threadingly attached spray nozzles 110. When operational and the lid 30 is placed on the lip 17 portion of the enclosure 15, the basting liquid 115 travels across the bottom surface 80, into the liquid sump 70, where it is picked up by the pickup suction arm 85. The basting liquid 115 then travels through the pump inlet tube 92 to the basting pump 65 where it is pressurized and continues to travel upward through the lower riser tube 90 and upper riser tube 100 and into the dispersing header 105. Once in the dispersing header 105, said basting liquid 115 exits through the downward facing spray nozzles 110 under pressure, where it recoats the foodstuffs 120. The excess basting liquid 115 falls off onto the bottom surface 80 of the enclosure 15 and repeats the process. This process provides a continuous basting of the foodstuffs 120 while being cooked, thus resulting in a meat product or the like which is moist and succulent to eat without continuous user intervention for manual basting during the cooking process.

The upper riser tube 100 is routed along an inner surface of the removable lid 30 being removably attached thereto via a plurality of molded-in or fastened tubing clips 102. Said tubing clips 102 comprise "C"-shaped flexible protrusions which provide snapping retention of said upper riser tube 100, thereby allowing easy disassembly for periodic cleaning. Said upper riser tube 100 is in turn connected to the dispersing header portion 105 via a slip-fit tubing connection. Said dispersing header 105 is affixed to the removable lid 30 along an inner top long axis of said lid 30 using a pair of threaded fasteners 140 such as screws, bolts, or the like. Said threaded fasteners 140 are envisioned to jointly fasten the second handle 37 as well as the dispersing header 105, to the removable lid 30 as seen here, thereby allowing easy disassembly of said removable lid 30 and dispersing header 105 for cleaning.

The dispersing header 105 comprises an elongated cylindrical or ovular member which provides an internal fluid communication means to convey said basting liquid 115 to the spray nozzles 110. Said basting liquid 115 is subsequently sprayingly deposited upon the subjacent foodstuffs 120 via said equally-spaced and downwardly-facing spray nozzles 110. Said spray nozzles 110 are arranged in a linear fashion along a length of the dispersing header 105 and are envisioned to be capable of propelling said basting liquid 115 onto the foodstuffs 120 in various patterns such as, but not limited to: a conical spray, a fan-shaped spray, dripping, or the like.

Figure 4:
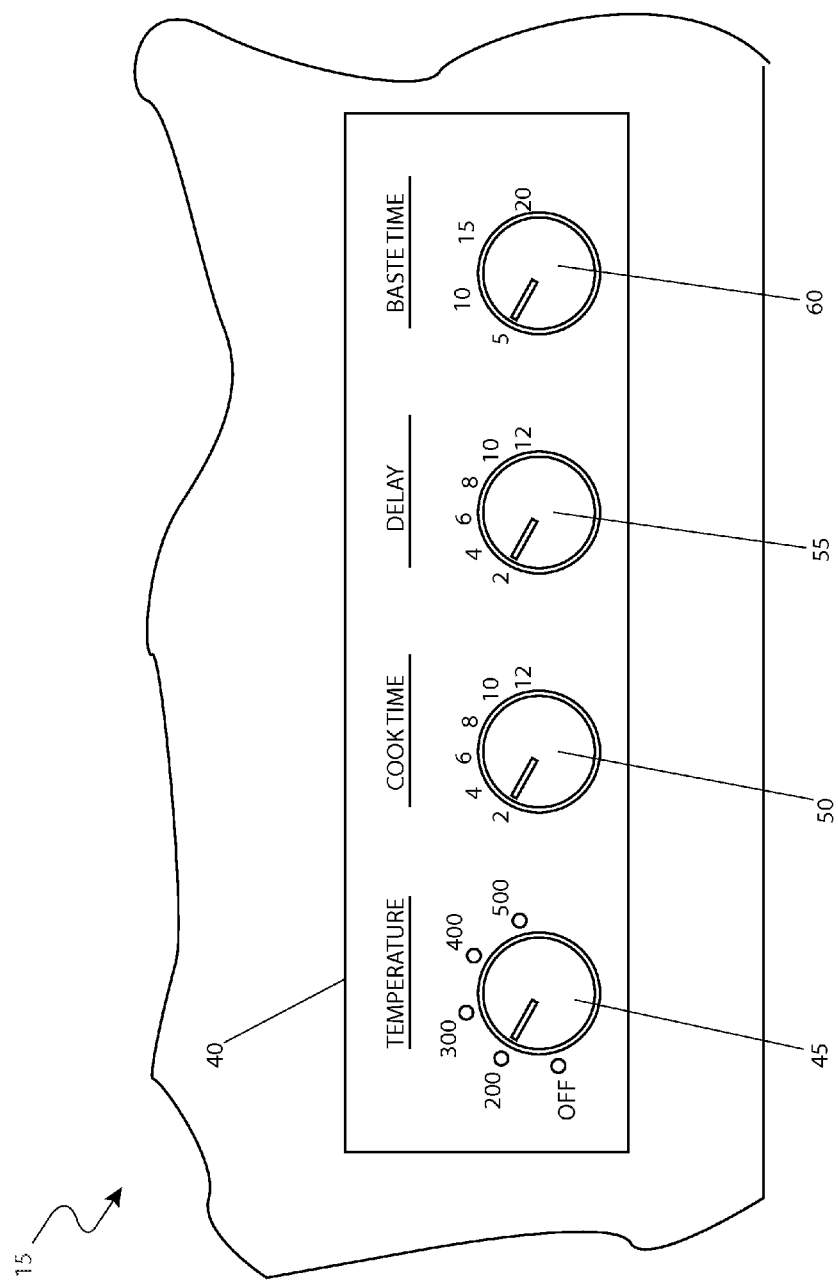
FIG. 4 is a close-up view of an operating control panel portion 40 of the self-basting roasting oven 10, according to the preferred embodiment of the present invention.

FIG. 4 is a close-up view of an operating control panel 40 of the apparatus 10, according to the preferred embodiment of the present invention, is disclosed. The dial portions of the operating control panel 40 provide control of basting process functions including a temperature setting dial 45, an operating time dial 50, a delay start time dial 55, and a basting interval dial 60. The basting interval control 60 provides activation of the basting pump 65 for approximately thirty (30) seconds, as a period of time selected upon the basting interval dial 60 has passed. The temperature setting dial 45 provides an "OFF" position to disconnect electrical power to the apparatus 10 in addition to providing a means to set a cooking temperature.

It is understood that the apparatus 10 is not limited to the particular aforementioned cooking controls and may be provided with additional control devices which may further enhance the basting and cooking process without deviating from the basic concept and as such should not be interpreted as a limiting factor of the apparatus 10.

Figure 5:
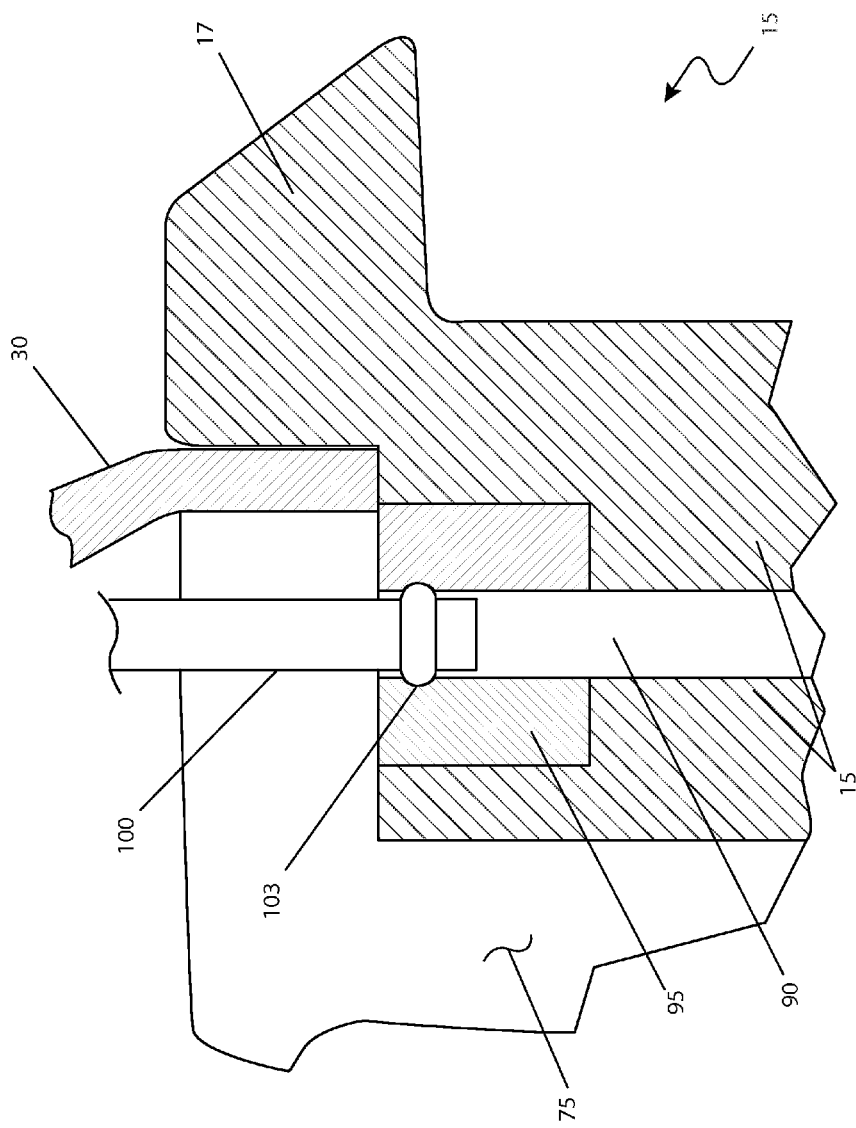
FIG. 5 is a partial break-away view of an enclosure portion 15 of the self-basting roasting oven 10 depicting a tubing joint portion 95, according to the preferred embodiment of the present invention.

Referring now to FIG. 5, a partial break-away view of the enclosure 15 depicting a tubing joint portion 95 of the apparatus 10, according to the preferred embodiment of the present invention, is disclosed. The basting liquid 115 is pumped upwardly through a lower riser tube 90 to tubing joint 95 being permanently affixed to an upper end portion of the lower riser tube 90. The tubing joint 95 provides a removably attachable and sealed means to covey the basting liquid 115 into an upper riser tube portion 100 of the removable lid 30. In such a manner, the lower riser tube 90 remains physically attached to the enclosure 15 while the upper riser tube 100 and removable lid 30 are removed. The tubing joint 95 comprises a cylindrically-shaped member made using a soft rubber compound and having a vertical center opening having a particular diameter to produce a sealed slip-fit connection with the upper riser tube 100 when inserted. Said upper riser tube 100 protrudes downwardly from the removable lid 30, being correspondingly positioned so as to insertingly engage said tubing joint 95. The upper riser tube 100 further comprises an integral sealing feature 103 comprising a rounded and protruding annular shape being formed in a wall portion of the upper riser tube 100 adjacent to a bottom end portion. When said bottom end portion of the upper riser tube 100 engages the tubing joint 95, the sealing feature 103 provides an effective sealed slip-fit connection against said inner diameter portion of said tubing joint 95, thereby preventing possible leaking of the basting liquid 115 when the basting pump 65 is running.

Figure 6:
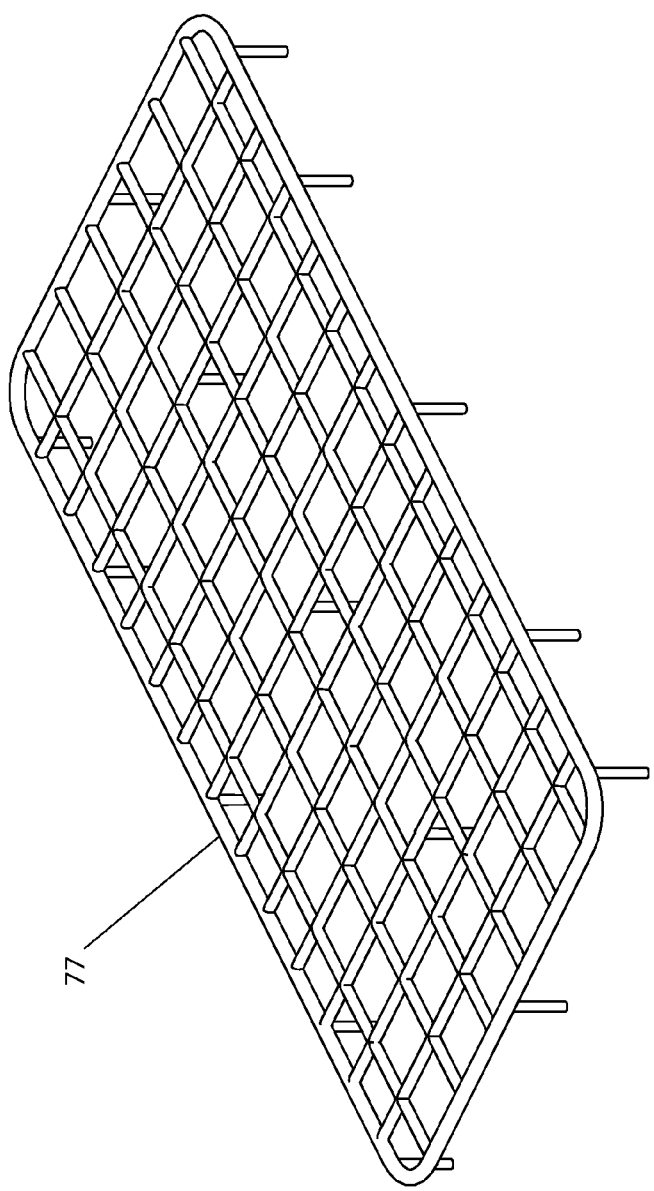
FIG. 6 is a perspective view of a cooking rack portion 77 of the self-basting roasting oven 10, according to the preferred embodiment of the present invention; and, FIG. 7 is an electrical schematic block diagram depicting the major electrical components utilized in the self-basting roasting oven 10, according to the preferred embodiment of the present invention.
Figure 7:
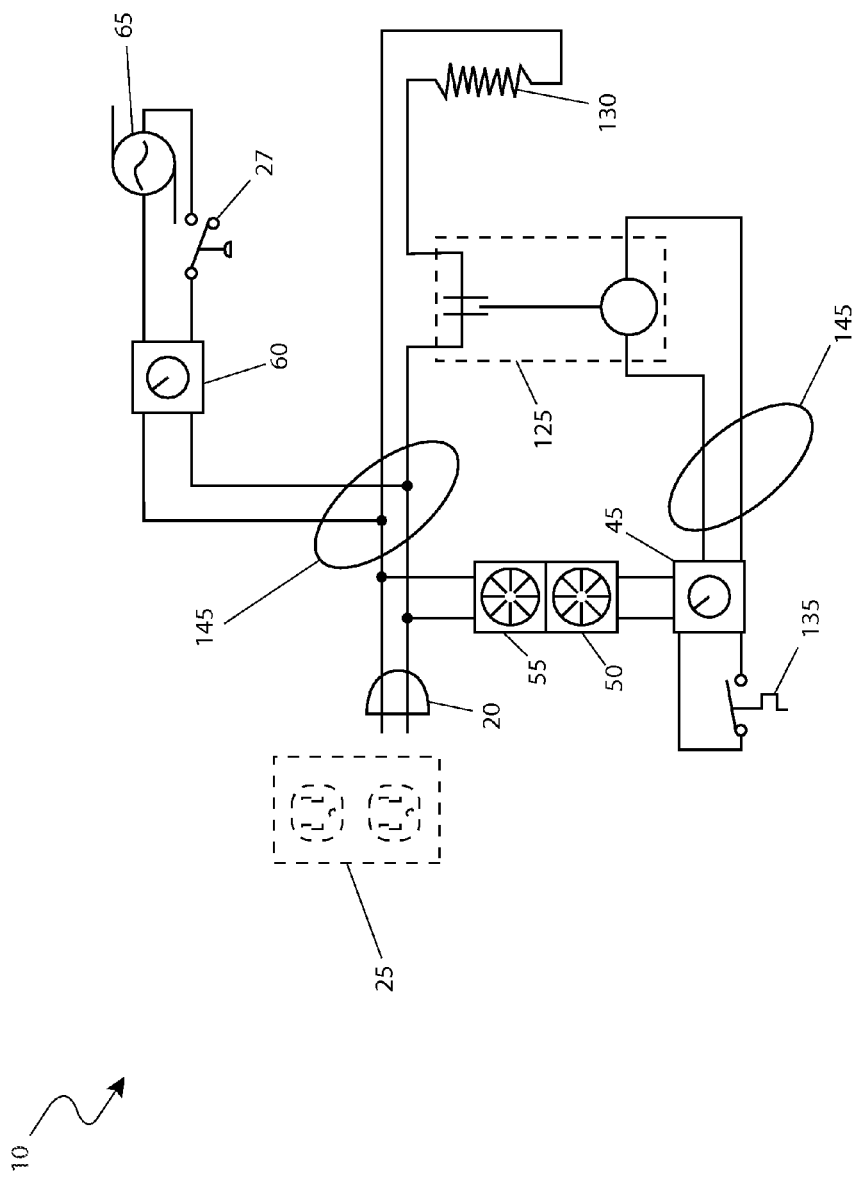

Referring to FIG. 6, an electrical schematic block diagram depicting the major electrical components as used with apparatus 10, according to the preferred embodiment of the present invention, is disclosed. Electrical power is supplied to the apparatus 10 from a household 120 VAC power outlet 25 via a power cord 20 which is in turn routed through an electrical contactor 125. Said electrical power is then conducted to an electrical heating element 130, thereby providing a conventional means to cook the foodstuffs 120. Power distribution to all electrical components of the apparatus 10 is performed via common wiring 145 within wall portions of the enclosure 15. The control side of the electrical contactor 125 is activated by adjustment of the temperature setting dial 45 and an internal thermostat 135 present in the circuit. Starting time and operating time is governed through adjustment of the operating time dial 50 and the delay time start dial 55 in a manner similar to conventional controls. The basting pump 65 is powered for approximately thirty (30) seconds, as a period of time selected upon the basting interval dial 60 has passed. Such time intervals comprise a period of time as selected on the basting interval dial 60. The process control devices provided upon the operating control panel 40 are the temperature setting dial 45, the operating time dial 50, the delay time start dial 55, and the basting interval dial 60. Said dials 45, 50, 55, 60 are envisioned to be of a simple analog variety; however, more complicated control equipment such as those provided by discrete electronic controllers, basic stamp modules, programmable controllers and the like can also be used with equal effectiveness, and as such, should not be interpreted as a limiting factor of the present invention. The safety switch 27 will disable power to the basting pump 65 and subsequent flow of the basting liquid 115 when the removable lid 30 is detached from the enclosure 15 by interrupting the flow of electrical current from the basting interval dial 60 to said basting pump 65 until the lid is replaced onto the enclosure 15.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the common user in a simple and effortless manner with little or no training. After initial purchase or acquisition of the apparatus 10, it would be utilized as indicated in FIGS. 1 through 4.

The method of utilizing the apparatus 10 may be achieved by performing the following steps: procuring a particular model of the apparatus 10 having a desired size cooking cavity 75 and exterior appearance; placing one (1) or more pieces of meat, poultry, or similar foodstuffs 120 to be cooked within the cooking cavity 75 of the enclosure 15; adding a suitable volume of initial basting liquid 115 into the cooking cavity 75; verifying that the temperature setting dial 45 is set to the "OFF" position; connecting the power cord 20 to a suitable source of electric power by plugging said power cord 20 into a 120 VAC power outlet 25 having sufficient current capabilities; placing the removable lid 30 upon the lip portion 17 of the enclosure 15; giving care to assure smooth engagement of the upper riser tube 100 into the tubing joint 95; utilizing the operating control panel 40 to set various operating parameters of the apparatus 10 by selecting a desired cook time using the operating time dial 50; selecting a desired delayed cooking start time using the delay time start dial 55; and, selecting a desired basting interval time using the basting interval dial 60; initiating the cooking cycle of the apparatus 10 by manually rotating the temperature setting dial 45 from the "OFF" position to a desired cooking temperature; and, benefiting from accurate and automatic basting of foodstuffs 120 afforded a user of the present invention 10.

During utilization of the apparatus 10 to perform the cooking process, the foodstuffs 120 would be cooked or roasted in the conventional manner by the application of heat from the heating element 130. During operation, the basting liquid 115 travels across the bottom surface 80 of the enclosure 15, through the strainer 86, and into the liquid sump 70 where it is picked up by the pickup suction arm 85. The basting liquid 115 is filtered through the filter 88 prior to entry within the pump inlet tube 92. The basting pump 65 pressurizes the basting liquid 115 and pumps said basting liquid 115 upwardly through the lower riser tube 90 and upper riser tube 100 and into the dispersing header 105. Once in the dispersing header 105, said basting liquid 115 exits through the downward facing spray nozzles 110 under pressure, where it recoats the foodstuffs 120. The excess basting liquid 115 then reenters the liquid sump 70 to repeat the basting process. The apparatus 10 provides a continuous basting of the foodstuffs 120 while being cooked, thus resulting in a meat, poultry, or similar foodstuff product 120 that is moist and succulent to eat without continuous user intervention for manual basting during the cooking process. At anytime during the basting process, if the removable lid 30 is lifted upwardly, the safety switch 27 will discontinue the action of the basting pump 65, thereby prohibiting the flow of basting liquid 115 through the downward facing spray nozzles 110. After the cooking process is completed, the foodstuffs 120 are removed for consumption and the remaining basting liquid 115 poured out.

Various components of the apparatus 10 may be disassembled and/or cleaned to allow for future usage, including the pickup suction arm 85, the strainer 86, the filter 88, the upper riser tube 100, the dispersing header 105, and the downward facing spray nozzles 110. Additional cleaning of the apparatus 10 is envisioned to be accomplished by assembling the apparatus 10 and circulating a heated solution of water and cleansers through the major components of the apparatus 10 by cycling the basting pump 65 as described above, being followed by a clean water rinse prior to storing the apparatus 10 until once again needed at a later date.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A self-basting roasting oven comprising:
   a roasting enclosure including a body having an upper lip, a sloping bottom with a sump, and a cavity, said roasting enclosure further including a lid for resting on said lip;
   an electric pump within said cavity;
   a pump inlet tube operatively connecting said pump to said sump;
   a tube joint adjacent said lip;
   a lower riser tube extending from said pump into said tube joint;
   a dispersing header attached to said lid, said dispersing header including a spray nozzle;
   a handle attached to said lid by a fastener that also attaches said dispersing header to said lid; and,
   an upper riser tube extending from said dispersing header to fit into said tube joint;
   wherein said upper riser tube is joined in fluid communication with said lower riser tube, via said tube joint, when said lid rests on said lip of said body; and,
   wherein liquid in said body drains into said sump for being pumped by said pump from said sump, through said pump inlet tube, through said lower riser tube, through said upper riser tube and into said dispersing header.

2. The self-basting roasting oven of claim 1, further including a filter operatively connected to said pump inlet tube.

3. The self-basting roasting oven of claim 2, further including a pickup suction arm disposed between said filter and said pump inlet tube.

4. The self-basting roasting oven of claim 1, further including a seal for sealing said upper riser tube to said tube joint.

5. The self-basting roasting oven of claim 4, further including a clip attaching said upper riser tube to said lid.

6. The self-basting roasting oven of claim 1, further including an electric heater element disposed under said bottom surface for heating said roasting enclosure.

7. The self-basting roasting oven of claim 6, further including an externally adjustable temperature control retained on said roasting enclosure and a temperature sensor within said roasting enclosure, said temperature control for controlling the operation of said electric heater element based on the output of said temperature sensor.

8. The self-basting roasting oven of claim 7, wherein said temperature control included an OFF switch.

9. The self-basting roasting oven of claim 1, further including a safety switch extending over said lip, said safety switch for preventing said pump from operating if said lid is not on said body.

10. The self-basting roasting oven of claim 9, further including a basting timer having a basting interval dial for controlling the operating time of said pump.

11. The self-basting roasting oven of claim 1, further including a removable strainer over said sump for blocking solids from entering said sump.

12. The self-basting roasting oven of claim 11, wherein said removable strainer comprises a screen-mesh.

13. The self-basting roasting oven of claim 1, wherein said tube joint is a cylindrical member for producing a slip-fit connection with the lower end of said upper riser tube.

14. The self-basting roasting oven of claim 1, wherein said lid is dome-shaped.

15. The self-basting roasting oven of claim 1, further including a cooking rack for retaining foodstuffs above said bottom surface.

* * * * *